July 25, 1939.  D. E. GRAY  2,166,990
ELECTROLYTIC CONDENSER AND METHOD OF PRODUCING SAME
Filed Aug. 22, 1934
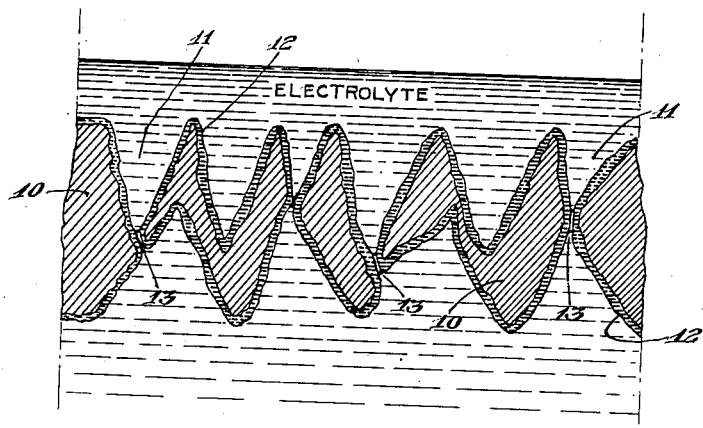
INVENTOR.
Donald E. Gray
BY
ATTORNEY.

Patented July 25, 1939

2,166,990

UNITED STATES PATENT OFFICE 2,166,990

ELECTROLYTIC CONDENSER AND METHOD OF PRODUCING SAME

Donald E. Gray, Yonkers, N. Y., assignor, by mesne assignments, to Cornell-Dubilier Electric Corporation, a corporation of New York Application August 22, 1934, Serial No. 740,875

7 Claims. (Cl. 148—8)

This invention relates to electrolytic devices, primarily electrolytic condensers, and methods of producing same and more particularly to a preliminary preparation of the metal electrodes such as plates, foils, etc. used in such devices by an etching or similar chemical process with the object to improve the electrical characteristics in particular to increase the capacity of the finished condenser.

As is well known in electrolytic condensers, at least one of the electrodes of the condenser having a dielectric film formed thereon and connected to the positive pole of a current source or network in which the condenser is used, serves as the positive electrode or anode of the condenser while the negative electrode is formed by the electrolyte. A second electrode is immersed in the electrolyte connected to the negative pole of the current source for conducting the current to the electrolyte. The capacity of such a condenser is determined substantially by the thickness of the dielectric film and the area of the metallic foil carrying the same and since the thickness of the film is furthermore determined by the voltage to which the condenser is formed and under which it is intended to operate, it follows that an increase of the capacity can be secured only by an increase of the effective surface area of the positive electrode or armature of the condenser.

Accordingly it is an object of this invention to provide a novel method for securing a maximum possible increase of the effective electrode surface of a condenser of given size by means of a novel treatment of the electrode, such as a plate or foil preparatory to the forming of the dielectric film thereon. A specific object of the invention is to provide a novel preparatory treating method for etching the surface of an electrode especially metallic foil upon which a dielectric film is to be formed for securing a maximum increase of the effective condenser surface area resulting in a considerable increase of the capacity of a condenser of given electrode surface area and size and bulk of the finished condenser.

A specific object of the invention is the provision of a novel method of pre-treating metallic foils in an etching solution preparatory to the forming of a dielectric film thereon and assembly into a finished condenser, by which the optimum etching time can be easily ascertained for a foil of given thickness insuring greatly improved characteristics of the finished condenser, particularly maximum capacity increase for a given size of foil and bulk of the finished condenser.

While the inventive method is primarily applicable, as pointed out, to the preparation and treatment of the electrode carrying the dielectric film (anode), the negative electrode, as will be understood, may be treated in a similar manner for increasing the contact surface of the electrolyte, resulting in a decrease of the contact resistance and corresponding decrease of the losses and power factor of the condenser.

It has already been proposed to treat electrodes for electrolytic devices, such as electrolytic condensers, by an etching process in a suitable acidified solution in order to increase the effective surface area and accordingly the capacity of the condenser. However, these methods have not been very successful heretofore obviously for the reason that impurities resulting from a reaction of the etching acid solution with the metal are left on the surface of the electrode and within the pores or craters produced by the etching action. These impurities may either block the electrolyte from the surface of the electrode, resulting in a decrease of the effective electrode surface and consequently a decrease of the capacity, or they may otherwise deleteriously react with the electrolyte during the operation of the condenser impairing its proper functioning and electrical characteristics.

While I am not committed to the above explanation of the disadvantages and drawbacks experienced with previous attempts of improving the characteristics of electrolytic condensers by an etching process of the electrodes preparatory to the forming of a dielectric film thereon, I have found that by a proper treatment of the electrode, as will be described hereafter, primarily of the positive electrode preparatory to the forming of the dielectric film thereon, a substantial capacity increase may be secured by using etched electrode foils without any of the additional disadvantages experienced in the art heretofore. I have found that the capacity may be doubled or even increased to a multiple as compared to a condenser of similar electrode area of the electrode surface or size and bulk of the finished condenser.

Further objects and advantages of the invention will appear hereinafter. The following example is given by way of illustrating the steps of my process, it being understood, however, that my invention is not restricted to the precise manipulations and materials therein specified.

A foil of aluminum of about 3 mil thickness and 20 square inch area is immersed in an etching solution compound of 175 cc. hydrochloride acid (HCl), 30 cc. nitric acid ($HNO_3$), 15 cc.

sulphuric acid (H₂SO₄) and 800 cc. water (H₂O), the etching time in this example being about four minutes.

This solution is heated to ebullition at about 100° C. when bubbles appear and is maintained at this temperature during the etching process. The foil is inserted in this solution and allowed to etch or dissolve away for a definite period of time, which in the case of a 3 mil foil, as pointed out, amounts to about four minutes. If the aluminum is thicker, the time will be longer, and if thinner, the time will be shorter. An easy method for determining the time required is by observing the foil and ascertaining when very minute pin holes appear therein hardly visible to the naked eye and observable only when the foil is backed by a strong light. In this simple manner, foil of any thickness may be properly etched to an extent insuring the improvement of the electrical characteristics to the highest degree possible and particularly a maximum capacity increase per unit surface area.

The accompanying drawing illustrates a small piece of foil etched in accordance with the invention on a greatly enlarged scale as seen through a microscope. The dimensions given are approximate only. Item 10 represents the foil formed with craters shown at 11 by the etching process and covered with a dielectric or oxide layer 12. As described, the etching is carried out to such an extent that minute pin holes shown at 13 are produced thereby insuring a maximum and constant surface and capacity of the condenser as described. The drawing further shows the electrolyte in close contact with the dielectric film which may be either liquid or semi-liquid depending on the type of condenser in which the foil is used.

According to a further feature of the invention, I have found it advantageous to use an acidified metal solution by dissolving a couple of strips of aluminum equivalent to an 8 microfarad-500 volt unit (about 20 square inch surface, as mentioned above) in each quantity of solution, as given above. The reason for this is that the aluminum chloride which is formed during the etching process apparently acts as a catalyst speeding up the reaction of the acids with the aluminum foil whereby the etching time is greatly reduced if a new solution is used directly on the anodes. I furthermore found it desirable to add from time to time certain amounts of additional solution to make up for the solution used during the etching of the aluminum. This additional solution need not have the aluminum dissolved therein but is a pure form made up according to the above formula, otherwise too much aluminum would be present and use up the acids of the solution, resulting in a much longer etching time. The amount added is about two to four cubic centimeters for an 8 microfarad-500 volt or equivalent foil to be etched. In this manner, it is possible to use the solution indefinitely and in a continuous process without the necessity of preparing new solutions.

After the foil has thus been etched, it is thoroughly washed, such as in ordinary tap water or distilled water, until all acid has been removed, and then dried. Preferably, first hot and then cold water is used. I then apply a special treatment for cleansing the pores or depressions produced by the etching of the foils and for removing and/or dissolving impurities and objectionable reaction products left within the pores and depressions as a result of a reaction between the etching acid and the metal. In this manner the surface increase obtained by the etching process is rendered full effective and undesired effects and impairment of the finished condenser by traces of objectionable impurities left are substantially prevented, resulting in a maximum capacity increase and improved performance and durability of the condenser. For this purpose I immerse the etched and washed foil in boiling glycerine (C₃H₅(OH)₃), in the example given for a period of about three to four minutes. In this manner traces of aluminum chloride or other aluminum salts and undesirable compounds left from the action of the first solution within the interstices of the pores and craters produced by the etching as well as residual traces of the etching acids are substantially dissolved and removed. These undesirable impurities are eliminated in this manner with full completeness by the hot glycerine solution by melting in the boiling glycerine or due to chemical action from the formation of glycerine chloride or glycerine nitrate.

Then the foil is again washed to eliminate any excess elements, such as glycerine or glycerine compounds and dried either at room temperature or under heat, in which latter case the glycerine is more easily removed from the foil. On the other hand, it may be desirable to leave some of the glycerine on the metal surface and to wash the foil with cold water only. It is not essential to use glycerine for the removal of the impurities of the etched foil but any other alcohol compound having similar properties to glycerine having a high boiling point and which does not affect the condenser unit, can be used for this purpose.

The thus prepared foil is then formed with a dielectric film in accordance with well-known anodic film-forming methods. A preferred formation for foil prepared in the above described manner giving satisfactory and good results consists in using a forming solution composed of parts boric acid, parts ammonia, and parts ethylene glycol boiled to a temperature of about 140° C., a preferred formula being

|  | Parts |
|---|---|
| Boric acid | 62 |
| Ammonia | 4 |
| Ethylene glycol | 54 |

At this temperature the solution is very thin and is adapted for a continuous forming process. The ethylene glycol can be replaced by any other well known polyhydroxyl alcohol which can be used in connection with forming films on electrodes. Also the boric acid can be replaced by any other well known types of weak acids suited for the formation of films, and the ammonia can be replaced by an alkali salt or alkali. During the formation, water is added from time to time in order to make up for the volume lost by evaporation caused by heating during the formation of the foil. While any other well-known method for forming the dielectric film on the etched foil may be employed, I have found that the above described method gives specially good results in connection with aluminum foils etched and treated preparatory to the film-forming in accordance with the process as described by the invention.

With the foil of 3 mil thickness and an anode surface of about 20 square inches, I have found that the capacity obtained is about 8 to 10 microfarads at 500 volt formation. When a thicker foil is used subjected to a preparatory etching process in accordance with the invention, the capacity is increased, resulting in a smaller surface area for a condenser of desired capacity. In this manner it is possible to obtain as much as a 20 to 1 ratio of the capacity per unit area as compared to the old type smooth unetched foil by an increase of the foil up to 15 mil thickness.

Anodes formed in this manner are then wound with an unformed or a similarly formed second foil with an interleaved fibrous separator such as of gauze or paper and assembled into a finished condenser roll and impregnated in a suitable manner by a liquid or paste type impregnating electrolyte. A preferred method for winding and impregnating the condenser with a paste electrolyte is described more fully in my copending application, Serial No. 733,976, filed July 6, 1934.

I have furthermore found that a condenser of this type can be reformed (final formation after assembly and impregnation) in less than one-tenth of the time of previous condensers on the formation racks. I have furthermore found that there is an increase in capacity during use and a general improvement in a condenser when used, the reason obviously being that as the condenser is put into use with the current applied that a more intimate contact exists between the electrolytes and the craters or depressions formed on the etched surface of the foil. The volume and size of the condensers made according to the process as described by the invention is a fraction of condensers made in accordance with methods heretofore known using smooth unetched foil resulting in a considerable lowering of initial and manufacturing costs.

It is understood that the process and steps and materials which I have specifically mentioned are subject to various modifications and variations without exceeding the limits of my invention which is to be restricted only by the scope of the appended claims.

I claim:

1. A method of preparing aluminum electrodes for use in electrolytic condensers which consists in subjecting the electrodes to the etching action of an acidified solution containing hydrochloric acid, stopping the etching action and immersing the etched electrodes in boiling glycerine to form a glycerine compound with metal salt impurities produced by reaction of said solution with the electrode metal as an incident to the etching, and dissolving and removing said glycerine compound.

2. A method of preparing aluminum electrodes for use in electrolytic devices which consists in subjecting the electrodes to the etching action of a solution containing hydrochloric acid, nitric acid, and water, stopping the etching action and washing and immersing the etched electrodes in hot glycerine to produce glycerine compounds with salts produced by reaction of the said solution with the aluminum as an incident to the etching and dissolving and removing said glycerine compounds.

3. A method of preparing aluminum electrodes for use in electrolytic condensers which consists in subjecting the electrode to the etching action of a solution composed of hydrochloric acid, nitric acid, sulphuric acid, and water maintained at ebullition temperature, stopping the etching action and immersing the etched electrodes in hot glycerine to produce glycerine compounds with salts produced by reaction of said solution with the aluminum as an incident to the etching, and dissolving and removing said glycerine compounds.

4. A method of preparing aluminum foils for use as electrodes in electrolytic condensers which consists in subjecting the foil to the etching action of a solution containing hydrochloric acid maintained at ebullition temperature, stopping the etching action and immersing the etched foil in hot glycerine to produce glycerine compounds with salt impurities produced by reaction of said solution with the electrode metal as an incident to the etching, and dissolving and removing said glycerine compounds.

5. A process of preparing aluminum elements for use in electrolytic condensers which comprises treating an element in an etching solution containing hydrochloric acid to roughen its surface while maintaining the solution at ebullition temperature, washing the roughened element in water and then treating it in hot glycerine.

6. A process of preparing aluminum elements for use in electrolytic condensers which comprises treating an element in an etching solution containing hydrochloric acid to roughen its surface, washing the roughened element in water and thereafter treating it in hot glycerine, and finally drying the element to remove the adhering glycerine.

7. A process of preparing aluminum elements for use in electrolytic condensers which comprises treating an element in a solution containing hydrochloric acid maintained at ebullition temperature to roughen its surface, washing the roughened element in water and treating it in hot glycerine and thereafter applying heat to remove the adhering glycerine.

DONALD E. GRAY.